(12) United States Patent
Higashi

(10) Patent No.: US 10,284,070 B2
(45) Date of Patent: May 7, 2019

(54) VOLTAGE CONVERSION DEVICE AND VOLTAGE CONVERSION METHOD

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Makoto Higashi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 28 days.

(21) Appl. No.: 15/544,573

(22) PCT Filed: Jan. 25, 2016

(86) PCT No.: PCT/JP2016/052037
§ 371 (c)(1),
(2) Date: Jul. 19, 2017

(87) PCT Pub. No.: WO2016/121702
PCT Pub. Date: Aug. 4, 2016

(65) Prior Publication Data
US 2018/0019654 A1   Jan. 18, 2018

(30) Foreign Application Priority Data
Jan. 27, 2015   (JP) .................................. 2015-013134

(51) Int. Cl.
*H02M 3/157*   (2006.01)
*H02M 1/08*   (2006.01)
(Continued)

(52) U.S. Cl.
CPC ............... *H02M 1/08* (2013.01); *H02M 1/14* (2013.01); *H02M 3/156* (2013.01); *H02M 3/158* (2013.01);
(Continued)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 7,825,642 B1 *  11/2010  Young ................... H02M 3/157
                                                     323/224
2007/0041224 A1 *  2/2007  Moyse ................... H02M 3/157
                                                     363/21.01

(Continued)

FOREIGN PATENT DOCUMENTS

| JP | H10-323027 A | 12/1998 |
|---|---|---|
| JP | 2000-358368 A | 12/2000 |
| JP | 2014-233196 A | 12/2014 |

OTHER PUBLICATIONS

Search Report from International Appliction No. PCT/JP2016/052037, dated Apr. 26, 2016, 2 pp.

*Primary Examiner* — Bryan R Perez
(74) *Attorney, Agent, or Firm* — Honigman Miller Schwartz and Cohn LLP

(57) ABSTRACT

A voltage conversion device and a voltage conversion method are provided in which, even immediately after switching a switching frequency, it is possible to suppress fluctuation of output voltage and possible to output a constant voltage in a stable manner. When switching the switching frequency from a first frequency to a second frequency, a duty ratio is changed in a first cycle of a PWM signal immediately after switching so as to be smaller than the duty ratio before switching. The amount of change in this case is (Continued)

set such that a lower limit value of inductor current immediately after switching the switching frequency matches the lower limit value in a steady state. With this sort of change, an increase in the inductor current immediately after switching is suppressed, fluctuation of the output voltage is suppressed, and a stable constant voltage is outputted to a load.

15 Claims, 9 Drawing Sheets

(51) Int. Cl.
    *H02M 3/158*     (2006.01)
    *H02M 1/14*     (2006.01)
    *H02M 3/156*     (2006.01)
    *H02M 1/00*     (2006.01)

(52) U.S. Cl.
    CPC .... *H02M 3/157* (2013.01); *H02M 2001/0012* (2013.01); *H02M 2001/0038* (2013.01)

(58) Field of Classification Search
    CPC ............... H02M 3/157; H02M 3/1563; H02M 2003/1566; H02M 2003/1557; H02M 2001/0012; H02M 2001/0009; H04B 2215/069
    See application file for complete search history.

(56) References Cited

U.S. PATENT DOCUMENTS

2009/0237049 A1*   9/2009   Hachiya ................ H02M 3/156
                                                                         323/282
2014/0327421 A1     11/2014   Arao

* cited by examiner

Switching frequency

PWM signal

Inductor current

Switching frequency

PWM signal

Inductor current

VOLTAGE CONVERSION DEVICE AND VOLTAGE CONVERSION METHOD

CROSS-REFERENCE TO RELATED APPLICATIONS

This application is the U.S. national stage of PCT/JP2016/052037 filed Jan. 25, 2016, which claims priority of Japanese Patent Application No. JP 2015-013134 filed Jan. 27, 2015.

TECHNICAL FIELD

The present invention relates to a voltage conversion device and a voltage conversion method that, by turning a switching element on/off with a PWM signal, transforms an inputted voltage and outputs the transformed voltage to a load.

BACKGROUND

In a device using a battery as a power source, often a DC/DC converter is provided as a power supply circuit for supplying power to a load. The DC/DC converter includes a switching element and an inductor, and by switching the switching element on/off based on a PWM signal, transforms (increases or decreases) voltage from the battery and outputs the transformed voltage to the load. With the DC/DC converter, even if the voltage of the external battery fluctuates, a constant voltage can be applied to the load by transforming (increasing or decreasing) the voltage from the battery.

As control schemes for stabilizing the output voltage of the DC/DC converter, there are known a voltage mode control scheme of feeding back the output voltage, a current mode control scheme of feeding back an output current in addition to the output voltage, and the like.

JP H10-323027A discloses a technique of switching a switching frequency for the switching element according to the output current in order to realize a DC/DC converter capable of suppressing a ripple current and maintaining a high transformation efficiency.

However, in a case of switching the switching frequency as with the DC/DC converter described in JP H10-323027A, there is a problem that the output voltage greatly fluctuates immediately after switching. The output voltage of the DC/DC converter is determined by an average value of inductor current flowing through the inductor, and immediately after switching the switching frequency, the inductor current is larger than the inductor current in the steady state, so the output voltage also increases. As a result, there is a problem that a constant voltage cannot be stably outputted to the load.

The present invention was made in view of the above circumstances, and it is an object of the present invention to provide a voltage conversion device and a voltage conversion method in which even immediately after switching the switching frequency, it is possible to suppress fluctuation of the output voltage, and possible to output a constant voltage to the load in a stable manner.

SUMMARY

A voltage conversion device according to the present invention is a voltage conversion device having a switching element, an inductor, and a drive circuit, the voltage conversion device generating, by turning the switching element on/off with the drive circuit with a PWM signal, an inductor current to transform an inputted voltage and output the transformed voltage to a load, the voltage conversion device including: switching means for switching a switching frequency with the drive circuit according to the size of output current to the load; and changing means for changing a waveform of the PWM signal when the switching means switches the switching frequency; wherein the changing means changes an on time of the PWM signal, and turns the switching element on/off.

A voltage conversion method according to the present invention is a voltage conversion method performed by a voltage conversion device having a switching element, an inductor, and a drive circuit, the voltage conversion device generating, by turning the switching element on/off with the drive circuit with a PWM signal, an inductor current to transform an inputted voltage and output the transformed voltage to a load, the voltage conversion method including: changing a waveform of the PWM signal when switching a switching frequency with the drive circuit according to the size of output current to the load; changing an on time of the PWM signal; and turning the switching element on/off.

In the present invention, the waveform of the PWM signal is changed when switching the switching frequency for the switching element. With this change, an increase in the average value of the inductor current immediately after switching the switching frequency is suppressed, and fluctuation of the output voltage immediately after switching the switching frequency is suppressed.

In the voltage conversion device according to the present invention, the changing means sets a change amount of the waveform of the PWM signal such that a lower limit value of the inductor current immediately after switching the switching frequency matches the lower limit value in a steady state.

In the present invention, the change amount of the waveform of the PWM signal is set such that a lower limit value of the inductor current immediately after switching the switching frequency matches the lower limit value in a steady state. Therefore, an increase in the average value of the inductor current immediately after switching the switching frequency is efficiently suppressed.

In the voltage conversion device according to the present invention, the change amount of the waveform of the PWM signal that the changing means changes includes at least one of the on time of the PWM signal and a duty ratio of the PWM signal.

In the present invention, the change amount of the waveform of the PWM signal that changes is at least one among the on time of the PWM signal, the duty ratio of the PWM signal, and the frequency of the PWM signal. Therefore, fluctuation in the output voltage immediately after switching the switching frequency is reliably suppressed.

In the voltage conversion device according to the present invention, the changing means changes the waveform in only one cycle of the PWM signal immediately after switching the switching frequency.

In the present invention, the waveform of the PWM signal immediately after switching the switching frequency is changed in only one cycle of the PWM signal. Therefore, fluctuation in the output voltage immediately after switching the switching frequency is suppressed quickly.

In the voltage conversion device according to the present invention, the changing means changes the waveform in a plurality of cycles of the PWM signal immediately after switching the switching frequency.

In the present invention, the waveform of the PWM signal immediately after switching the switching frequency is changed in a plurality of cycles of the PWM signal. Therefore, fluctuation in the output voltage is suppressed without a large fluctuation immediately after switching the switching frequency.

In the voltage conversion device according to the present invention, when switching the switching frequency with the switching means, the on time of the PWM signal immediately after switching is shorter than the on time of the PWM signal immediately before switching.

In the present invention, the on time of the PWM signal immediately after switching the switching frequency is set shorter than the on time immediately before switching. Therefore, fluctuation in the output voltage immediately after switching the switching frequency is reliably suppressed.

According to the present invention, because the waveform of the PWM signal is changed when switching the switching frequency, even immediately after switching the switching frequency, it is possible to suppress fluctuation of the output voltage, and possible to output a constant voltage to the load in a stable manner.

DETAILED DESCRIPTION OF THE PREFERRED EMBODIMENTS

Following is a detailed description of the present invention with reference to drawings showing embodiments of the present invention.

First Embodiment

Figure 1:
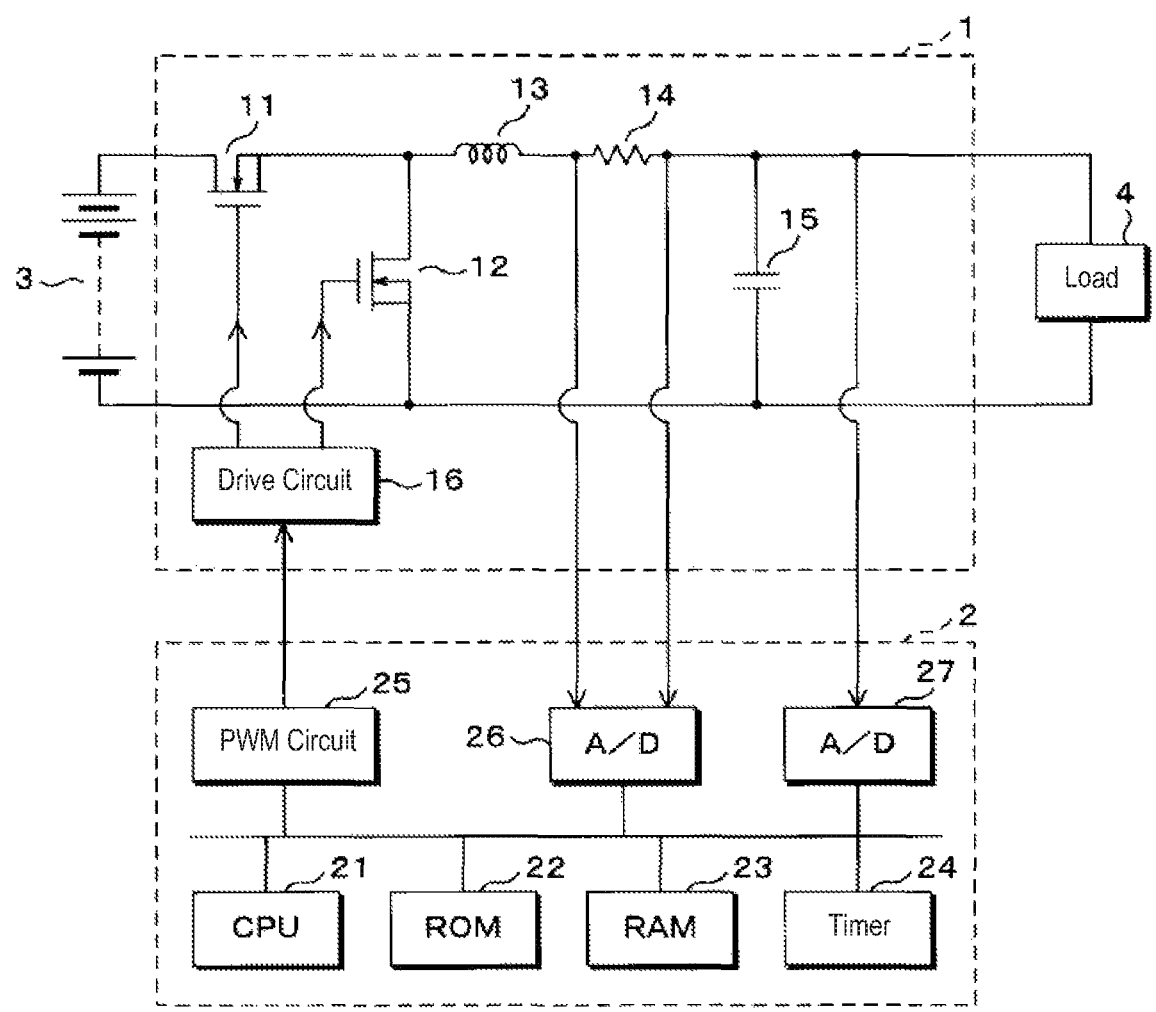
FIG. 1 is a block diagram showing an exemplary configuration of a voltage conversion device according to the present invention.
Figure 2:
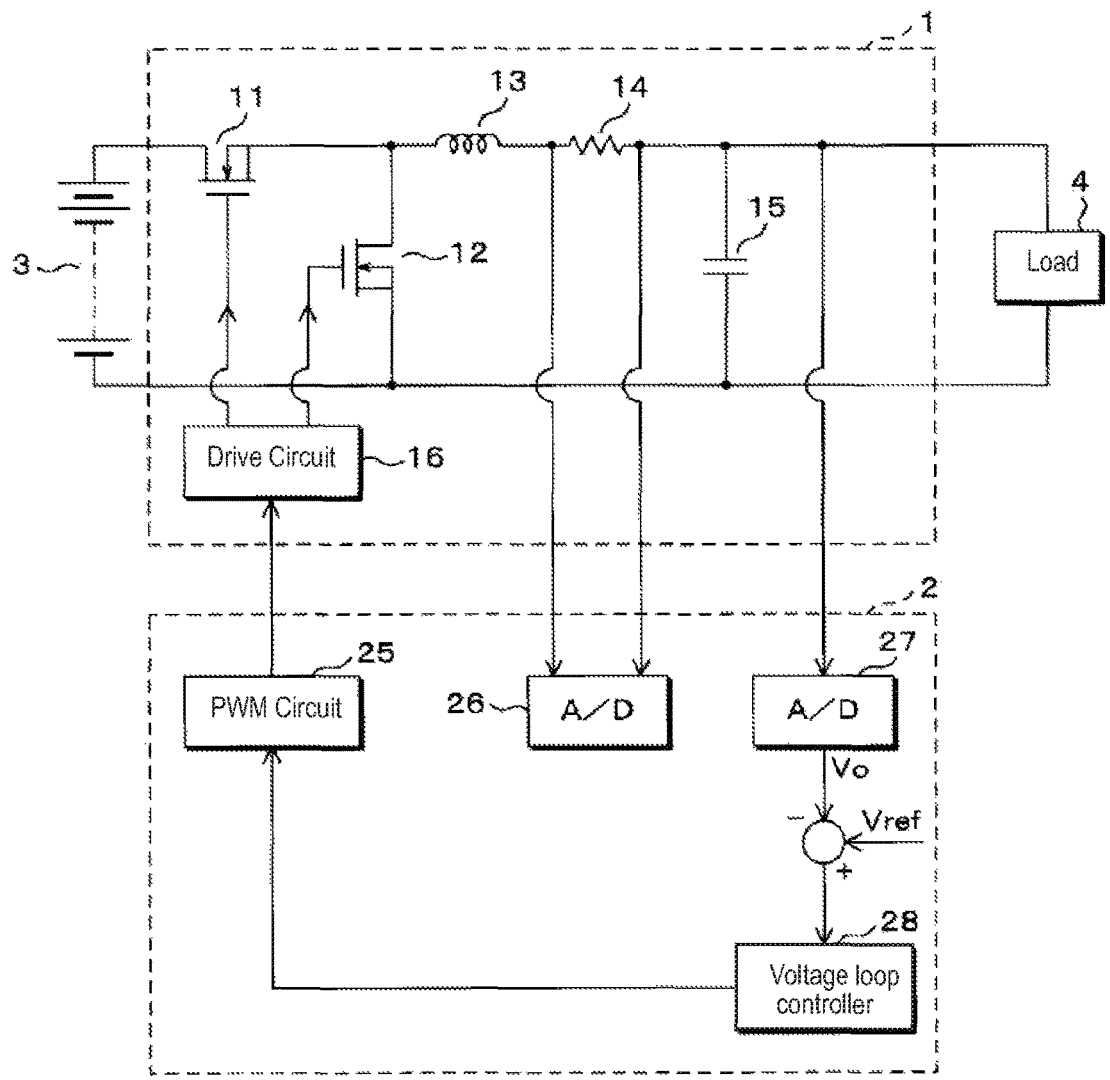
FIG. 2 is a block diagram showing a functional configuration of a control unit in the voltage conversion device.

FIG. 1 is a block diagram showing an exemplary configuration of a voltage conversion device according to a first embodiment of the present invention, and FIG. 2 is a block diagram showing a functional configuration of a control unit 2 in the voltage conversion device. The voltage conversion device shown in FIG. 1 includes, for example, a DC/DC converter 1 that reduces the voltage of an external battery 3 and supplies this reduced voltage to a load 4, and the control unit 2, which confers a PWM signal to the DC/DC converter 1.

The DC/DC converter 1 includes a switching element 11 having one end connected to the battery 3, a second switching element 12 and an inductor 13 each having one end connected to the other end of the switching element 11, a resistor 14 having one end connected to the other end of the inductor 13, and a capacitor 15 connected between the other end of the resistor 14 and a ground potential. The other end of the second switching element 12 is connected to the ground potential. The load 4 is configured to be connected to both ends of the capacitor 15. The switching element 11 and the second switching element 12 are, for example, N-channel MOSFETs each having their drain on the one end.

The DC/DC converter 1 also includes a drive circuit 16 that confers a drive signal that turns the switching element 11 and the second switching element 12 on/off. The drive circuit 16 respectively confers a PWM signal conferred from the control unit 2, and a PWM signal complementary to that PWM signal, to gates of the switching element 11 and the second switching element 12.

The control unit 2 has a CPU 21, and the CPU 21 is connected through a bus to a ROM 22 that stores information such as a program, a RAM 23 that temporarily stores generated information, and a timer 24 that clocks various time periods such as a cycle of PWM control.

The CPU 21 is also connected through a bus to a PWM circuit 25 that generates a PWM signal to be conferred to the drive circuit 16, an A/D conversion circuit 26 that detects voltage across both ends of the resistor 14 and converts current flowing through the resistor 14 into a digital current value, and an A/D conversion circuit 27 that converts voltage across both ends of the capacitor 15 into a digital voltage value.

In FIG. 2, the control unit 2 realizes a function of a voltage loop controller 28 for controlling the output voltage to be output from the DC/DC converter 1 to the load 4 by so-called "voltage mode control". In the drawing, the symbol "○" represents a subtractor.

Based on a deviation obtained by subtracting, from a target voltage value Vref, a digital voltage value Vo, which is obtained by converting the output voltage that was outputted to the load 4 with the A/D conversion circuit 27, the voltage loop controller 28 calculates an on time of the PWM signal and outputs the calculated on time to the PWM circuit 25. The PWM circuit 25 generates a PWM signal having a duty ratio corresponding to the conferred on time.

In the voltage conversion device having such a configuration, the switching frequencies for the switching element 11 and the second switching element 12 are switched according to the size of the output current to the load 4 so as to result in good voltage conversion efficiency. For example, when the output current is 20 A or more, the switching frequency is set to 150 kHz, and when the output current is less than 20 A, the switching frequency is set to 100 kHz.

When switching the switching frequency in this way, immediately after switching the switching frequency, the inductor current flowing through the inductor 13 becomes larger than the inductor current in the steady state, and the output voltage, which is proportional to the average value of the inductor current, also increases and fluctuates.

Therefore, in the voltage conversion device of the present invention, by changing (correcting) the waveform of the PWM signal immediately after switching the switching frequency, such fluctuation of the output voltage generated when switching the switching frequency is suppressed.

Figure 3:
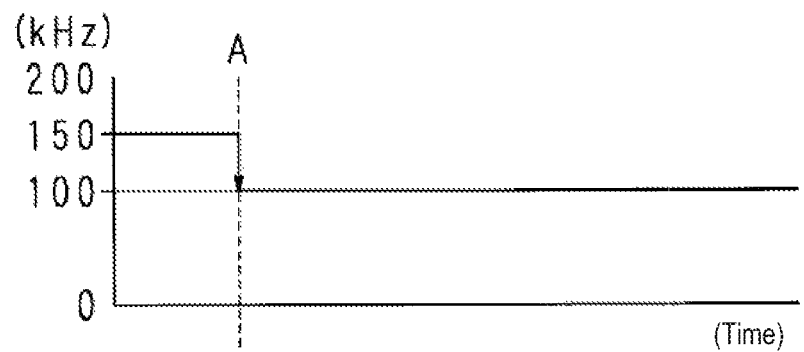
FIG. 3 is a timing chart showing a relationship between a switching frequency, a PWM signal, and an inductor current according to a comparative example.
Figure 3:
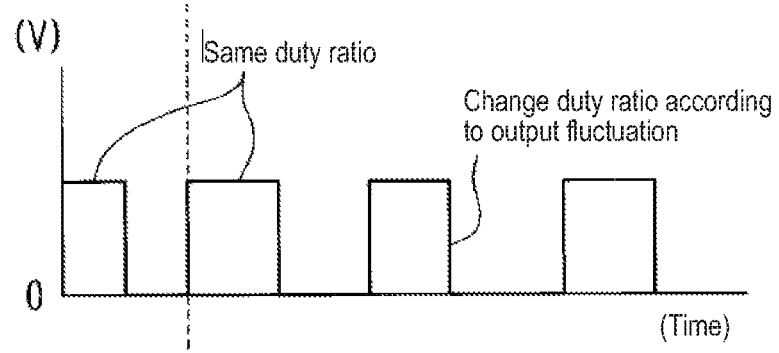
Figure 3:
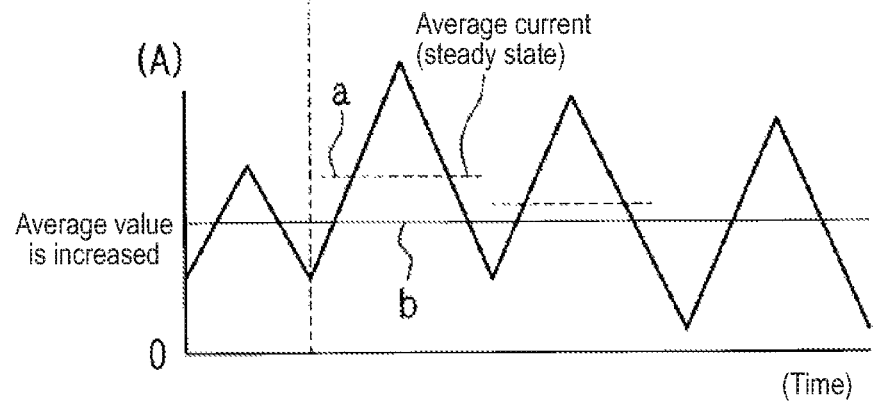
Figure 4:
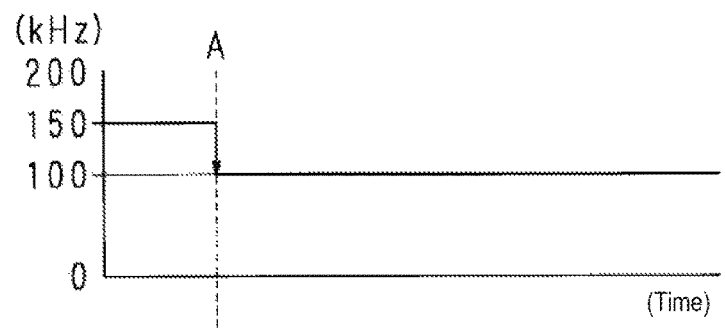
FIG. 4 is a timing chart showing a relationship between a switching frequency, a PWM signal, and an inductor current according to a first embodiment of the present invention.
Figure 4:
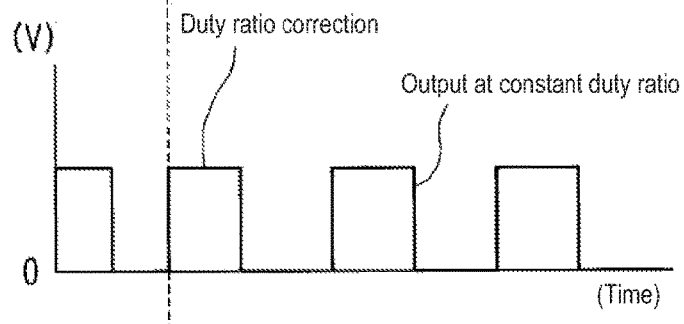
Figure 4:
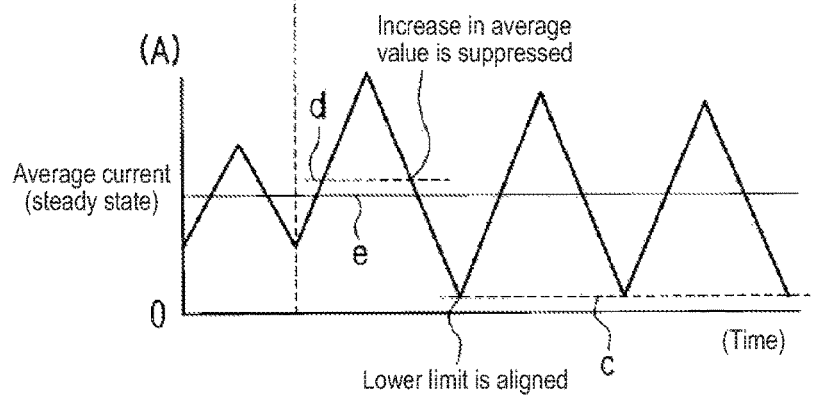

FIGS. 3 and 4 are timing charts showing a relationship between the switching frequency, the PWM signal, and the inductor current before and after switching the switching frequency, with FIG. 3 showing a comparative example (a conventional example) in which a change as in the present invention is not performed, and FIG. 4 showing an example according to the first embodiment of the present invention. In both examples, the switching frequency is switched from 150 kHz to 100 kHz at time A.

In the comparative example (conventional example) shown in FIG. 3, the duty ratio in the PWM signal immediately after switching is the same as before switching, and no change is performed. Therefore, the inductor current immediately after switching becomes large, and its average value (represented by broken line a) increases in comparison to the average value in the steady state (represented by solid line b). As a result, the output voltage also fluctuates greatly.

On the other hand, in the example of the present invention shown in FIG. 4, the change in the inductor current that accompanies switching of the switching frequency is predicted, and the duty ratio in one cycle of the PWM signal immediately after switching is changed such that the lower limit value of the inductor current immediately after switching matches the lower limit value of the inductor current in the steady state (represented by broken line c). Specifically, correction is performed such that in the first cycle of the PWM signal immediately after switching, the duty ratio is smaller than before switching. Therefore, the inductor current immediately after switching does not increase greatly, and the degree of increase of that average value (represented by broken line d) with respect to the average value in the steady state (represented by solid line e) is small. As a result, fluctuation in the output voltage is suppressed.

Following is a description of specific values of the change amount in the PWM signal immediately after switching, that is, specific values of the duty ratio after the change immediately after switching the switching frequency, and the on time after the change.

The duty ratio D' after the change is calculated by the following Formula (1).

$$D'=[D(1-D)/2 \times (1/F1)+D(1+D)/2 \times (1/F2)] \times F2 \quad (1)$$

Note: F1 represents the switching frequency before switching,
F2 represents the switching frequency after switching, and
D represents the duty ratio before the change.

The on time ON' after the change is obtained by D'×(1/F2), so by substituting a relationship where D=ON×F1, with ON representing the on time before the change, into above Formula (1), ON' is calculated by the following Formula (2).

$$ON'=[ON \times F1 \times (1-ON \times F1)]/(2 \times F1)+[ON \times F1 (1+ON \times F1)]/(2 \times F2) \quad (2)$$

The process of deriving the formulas above will be described with reference to FIG. 5. The relationship between the switching frequency, the PWM signal, and the inductor current before and after switching the switching frequency is as expressed in FIG. 5, where the width of increase of the inductor current before switching the switching frequency is represented by Iα, and the width of increase of the inductor current immediately after switching the switching frequency is represented by (Iα/2)+Iß. Note that in FIG. 5, Tß represents a part of the on time immediately after switching the switching frequency.

Figure 5:
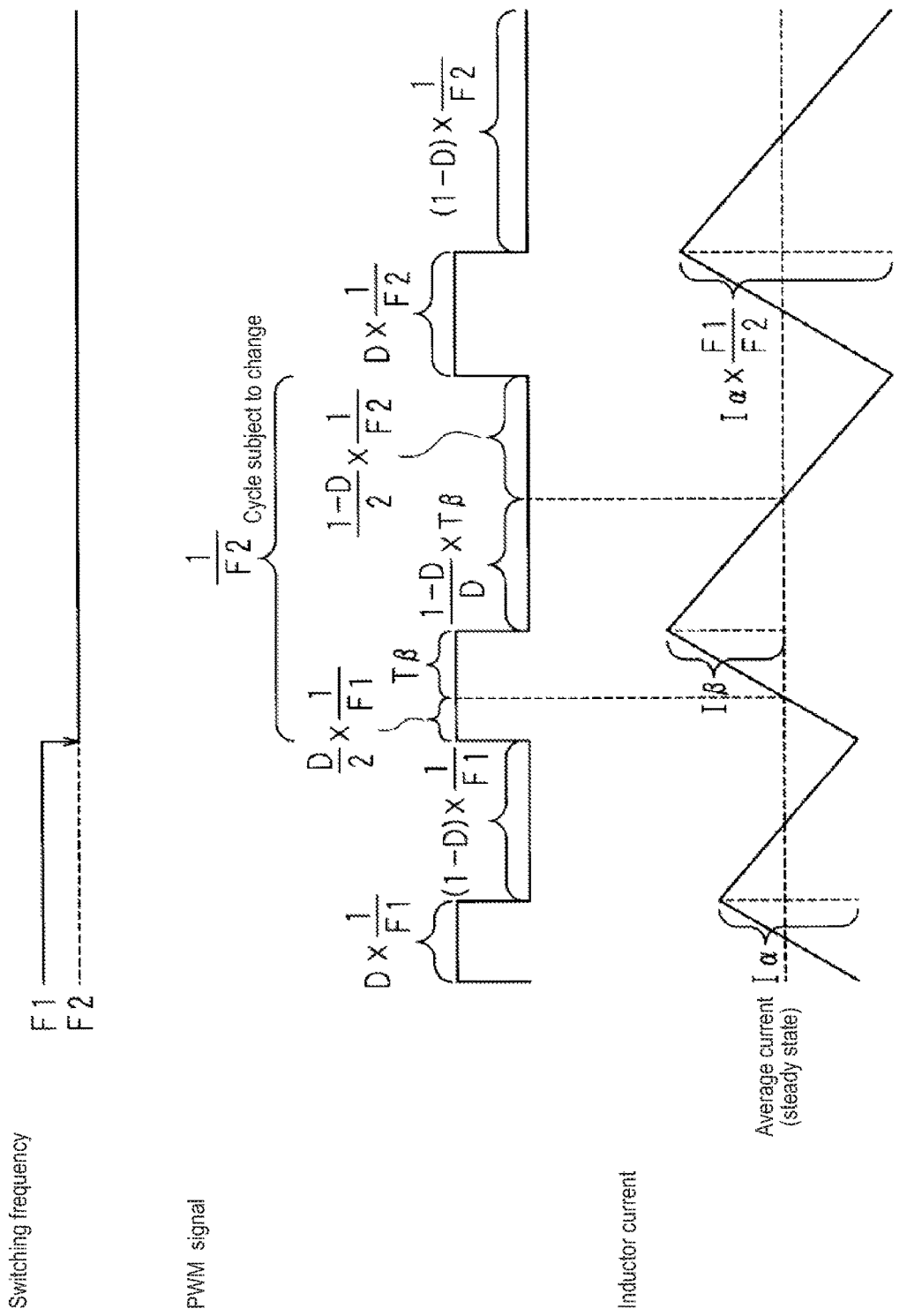
FIG. 5 is a timing chart showing a relationship between a switching frequency, a PWM signal, and an inductor current before and after switching the switching frequency, in order to explain how a change amount is derived.

In FIG. 5, looking at the time immediately after switching the switching frequency from F1 to F2, first, the slope of the inductor current during an off state is (1−D)/D times the slope of the inductor current during an on state, so a cycle 1/F2 after switching is obtained by the following Formula (3).

$$1/F2=(D/2) \times (1/F1)+Tß+[(1-D)/D] \times Tß+[(1-D)/2] \times (1/F2) \quad (3)$$

The duty ratio after the change is indicated by the on time divided by the cycle, so the duty ratio D' after the change is obtained by the following Formula (4).

$$D'=[(D/2) \times (1/F1)+Tß] \times F2 \quad (4)$$

When above Formula (3) is solved for Tß, the following Formula (5) is obtained.

$$Tß=[D(1+D)/2] \times (1/F2)-(D^2/2) \times (1/F1) \quad (5)$$

By substituting Formula (5) into Formula (4), the duty ratio D' after the change is obtained as follows, and thereby above Formula (1) is obtained.

$$D'=[(D/2) \times (1/F1)+[D(1+D)/2 \times (1/F2)-(D^2/2) \times 1/F1)] \times F2=[D(1-D)/2 \times (1/F1)+D(1+D)/2 \times (1/F2)] \times F2$$

Figure 6:
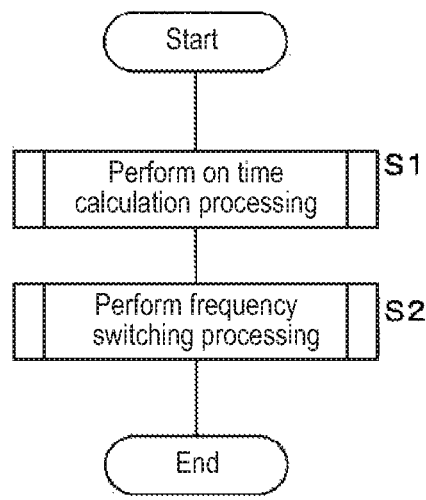
FIG. 6 is a flowchart showing an operation procedure of the voltage conversion device according to the present invention.

Next, operation will be described. FIG. 6 is a flowchart showing an operation procedure of the voltage conversion device. The operation shown in FIG. 6 is performed for each control cycle of PWM control, and is executed by the CPU 21 according to a control program stored in advance in the ROM 22.

The operation of the voltage conversion device includes on time calculation processing (step S1), which is feedback control of the PWM signal based on the detected output voltage, and frequency switching processing (step S2) in which it is determined whether or not it is necessary to switch the switching frequency, and if necessary, a change amount in the PWM signal is calculated and switching is performed. The CPU 21 executes this processing. Following is a detailed description of the on time calculation processing (step S1) and the frequency switching processing (step S2).

Figure 7:
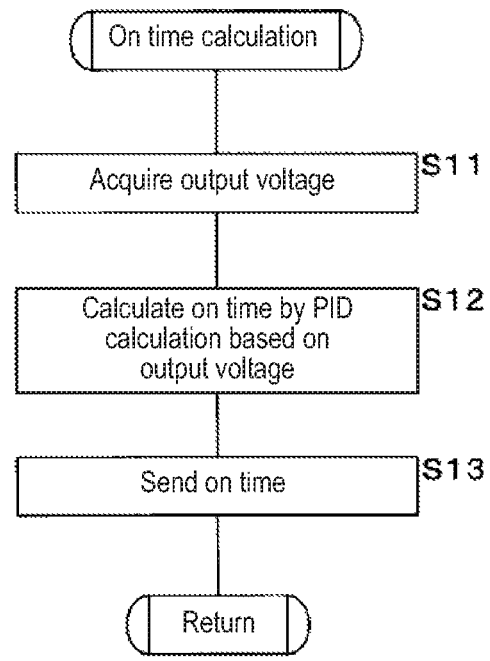
FIG. 7 is a flowchart showing an operation procedure (a subroutine of step S1) of on time calculation processing.

FIG. 7 is a flowchart showing an operation procedure of the on time calculation processing performed by the CPU 21, that is, a subroutine of step S1 in FIG. 6.

The CPU 21 acquires the digital voltage value obtained by the A/D conversion circuit 27 converting the output voltage that was outputted to the load 4 (step S11). Next, based on the acquired voltage value (Vo) of the output voltage, the CPU 21 performs PID calculation such that the output voltage becomes a target voltage value (Vref), thereby calculating the on time (step S12). The CPU 21 sends the calculated on time to the PWM circuit 25 (step S13), and ends processing. A PWM signal is generated by the PWM circuit 25 according to the on time that was sent.

Figure 8:
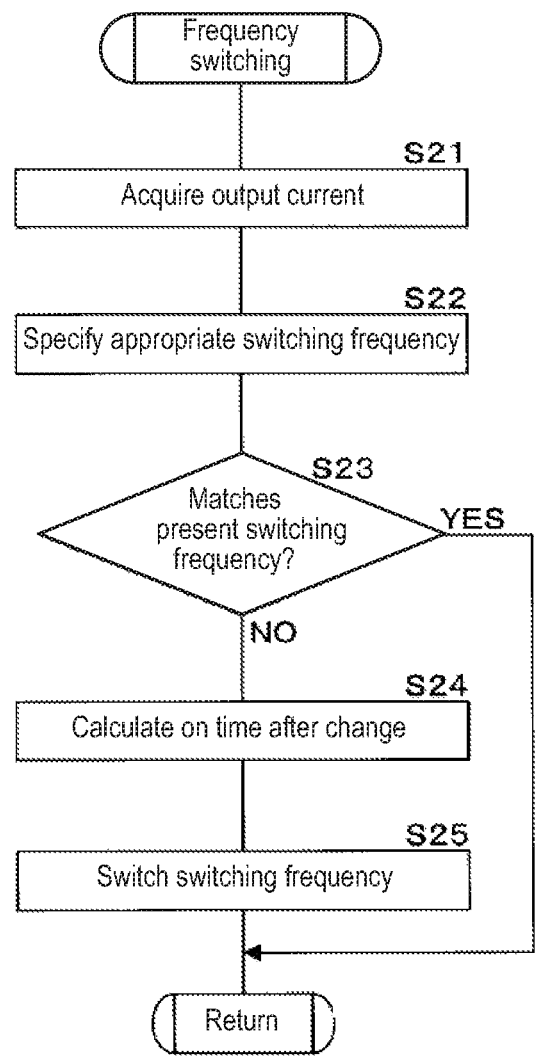
FIG. 8 is a flowchart showing an operation procedure (a subroutine of step S2) of frequency switching processing.

FIG. 8 is a flowchart showing an operation procedure of the frequency switching processing performed by the CPU 21, that is, a subroutine of step S2 in FIG. 6.

The CPU 21 acquires the digital current value obtained by the A/D conversion circuit 26 converting the output current outputted to the load 4 (step S21). The CPU 21 specifies a switching frequency appropriate for the current value of the acquired output current (step S22). Specifically, when the acquired current value is 20 A or more, the CPU 21 specifies the switching frequency as 150 kHz, and when the acquired current value is less than 20 A, the CPU 21 specifies the switching frequency as 100 kHz.

The CPU 21 determines whether or not the specified switching frequency matches the present switching frequency (step S23). If they match (S23: YES), the CPU 21 ends processing.

On the other hand, if they do not match (S23: NO), the CPU 21, according above Formula (2), using the on time before the change, the present switching frequency (the switching frequency before the change), and the specified switching frequency (the switching frequency after the change), calculates the on time after the change (step S24). Then, the CPU 21 switches the present switching frequency to the specified switching frequency (step S25), and ends processing. The on time in the first cycle immediately after switching the switching frequency of the PWM signal is the on time that was calculated in step S24.

In the first embodiment as described above, when switching the switching frequency for the switching elements 11 and 12 in order to increase the conversion efficiency of voltage from the battery 3, the properties (on time) of the waveform of the PWM signal immediately after switching are changed, so it is possible to suppress an increase in the inductor current immediately after switching, which is caused by the switching, and as a result, it is possible to suppress fluctuation of the output voltage, so a constant voltage can be outputted to the load 4 in a stable manner.

Second Embodiment

Following is a description of a second embodiment of the present invention. Note that the configuration of the voltage conversion device according to the second embodiment is the same as the configuration of the voltage conversion device according to the above-described first embodiment (FIGS. 1 and 2).

In the above-described first embodiment, only the on time in one cycle of the PWM signal immediately after switching the switching frequency is changed, but in the second embodiment, the on time in a plurality of cycles of the PWM signal immediately after switching the switching frequency is changed. The second embodiment is preferable when feedback control based on the output voltage is not performed for each cycle of the PWM signal.

Figure 9:
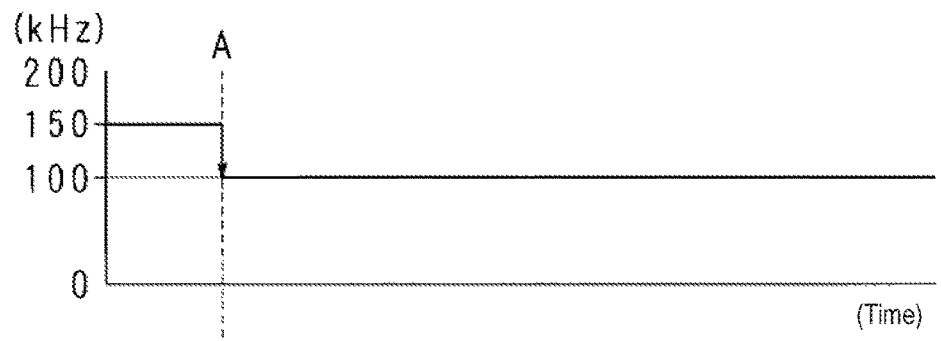
FIG. 9 is a timing chart showing a relationship between a switching frequency, a PWM signal, and an inductor current according to a second embodiment of the present invention.
Figure 9:
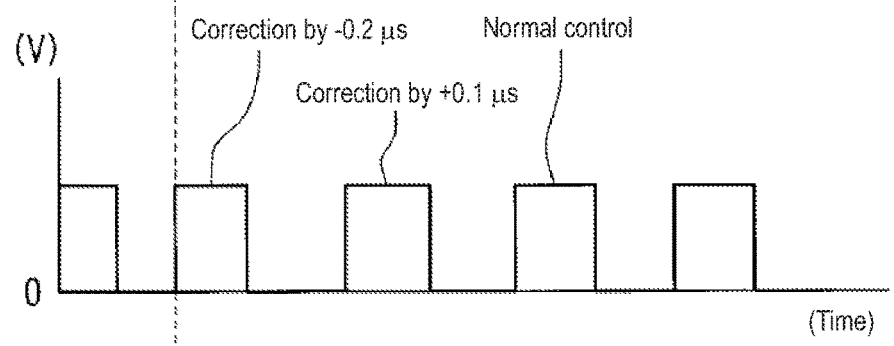
Figure 9:
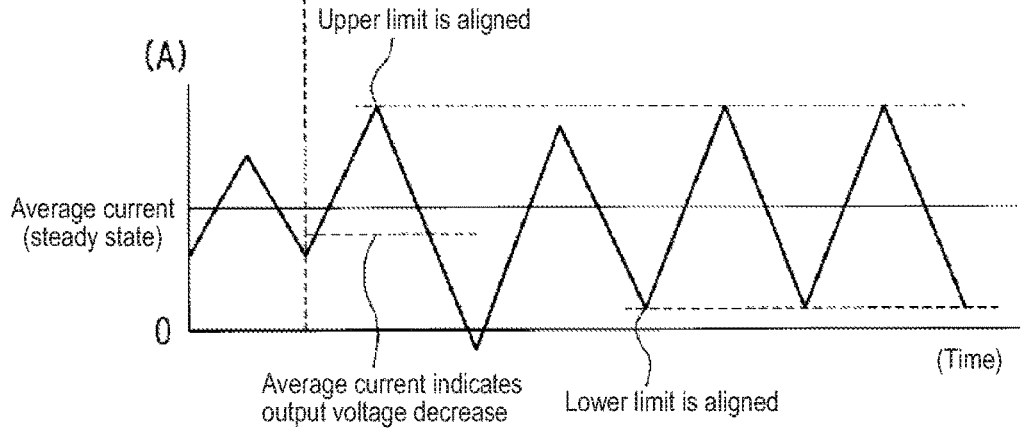

FIG. 9 is a timing chart showing the relationship between the switching frequency, the PWM signal, and the inductor current according to the second embodiment. As in the first embodiment, the switching frequency is switched from 150 kHz to 100 kHz at time A. When doing so, in the example shown in FIG. 9, the on time is changed over two cycles immediately after switching the switching frequency. That is, in the first cycle immediately after switching the switching frequency, the on time is changed by −0.2 μs such that the upper limit value of the inductor current matches the upper limit value in the steady state, and in the second cycle, the on time is changed by +0.1 μs such that the lower limit value of the inductor current matches the lower limit value in the steady state, and from the third cycle onward, normal control is performed.

In the second embodiment, the fluctuation of the output voltage is not in a direction of increase but in a direction of decrease, so when switching the switching frequency, there is no fear of exceeding the upper limit voltage indicated in specifications.

Note that regarding the on time to be changed to, preferably a transition of the inductor current when the switching frequency was switched is assumed, and based on the results of that assumption, the on time to be changed to is calculated in the same manner as in the above-described first embodiment, using the switching frequency before switching, the switching frequency after switching, and the on time before the change, such that the upper limit value or the lower limit value of the inductor current matches the upper limit value or the lower limit value in the steady state.

Third Embodiment

Following is a description of a third embodiment of the present invention. Note that the configuration of the voltage conversion device according to the third embodiment is the same as the configuration of the voltage conversion device according to the above-described first embodiment (FIGS. 1 and 2).

In the above-described first embodiment, the on time in one cycle of the PWM signal immediately after switching the switching frequency is changed, but in the third embodiment, the frequency in one cycle of the PWM signal immediately after switching the switching frequency is changed.

Figure 10:
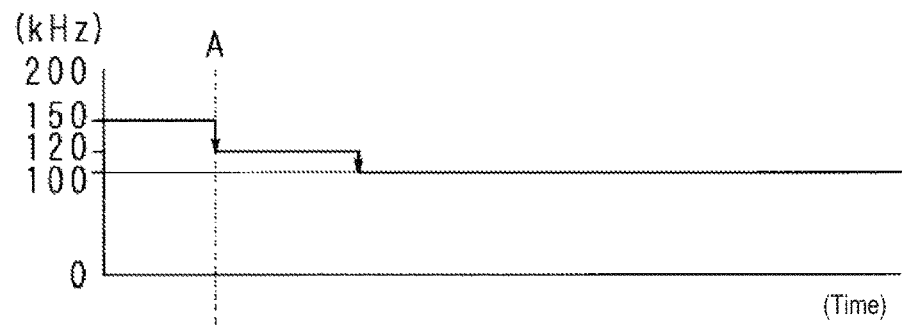
FIG. 10 is a timing chart showing a relationship between a switching frequency, a PWM signal, and an inductor current according to a third embodiment of the present invention.
Figure 10:
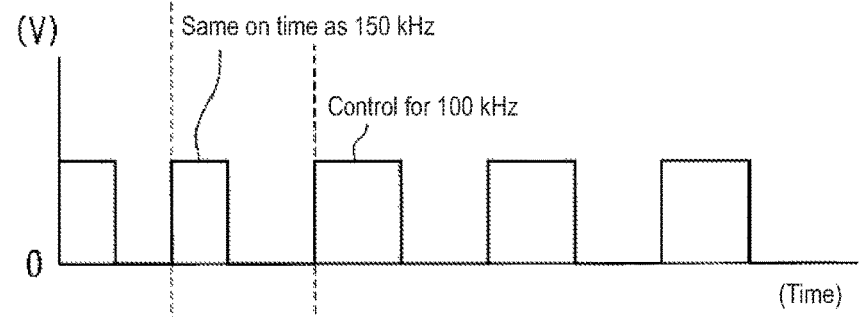
Figure 10:
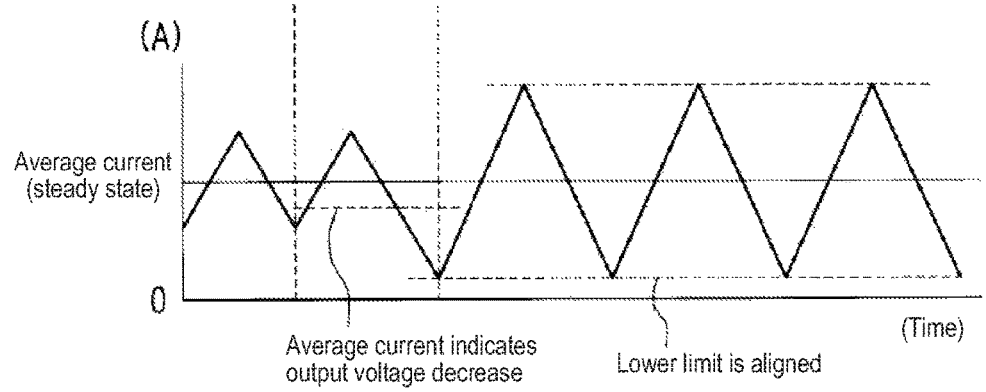

FIG. 10 is a timing chart showing the relationship between the switching frequency, the PWM signal, and the inductor current according to the third embodiment. As in the first embodiment, the switching frequency is switched at time A. When doing so, in the example shown in FIG. 10, in only one cycle immediately after switching the switching frequency, the on time is not changed but rather the frequency of the PWM signal is set to 120 kHz, and from the second cycle onward the frequency of the PWM signal is set to 100 kHz.

In this way, in the third embodiment, in order for the lower limit value of the inductor current immediately after switching the switching frequency to be aligned with the lower limit value in the steady state, immediately after switching the switching frequency, the on time of the PWM signal is not changed, but rather, the frequency of the PWM signal is changed.

Note that regarding the frequency to be changed to in the first cycle immediately after switching, preferably a transition of the inductor current when the switching frequency was switched is assumed, and based on the results of that assumption, the frequency to be changed to is calculated in the same manner as in the above-described first embodiment, using the switching frequency before switching, the switching frequency from the second cycle onward after switching, and the on time before the change, such that the lower limit value of the inductor current matches the lower limit value in the steady state.

Fourth Embodiment

In the above-described third embodiment, the on time immediately after switching the switching frequency is fixed, but as a mode in which the first and third embodiments are combined, it is also possible to simultaneously change the on time and the frequency immediately after switching the switching frequency, and align the lower limit of the inductor current immediately after switching.

Note that in the first to fourth embodiments, a case is described in which the switching frequency is switched from 150 kHz to 100 kHz according to the size of the output current, but this is given as an example, and the present invention is likewise applicable to a case in which, for example, the switching frequency is switched from 125 kHz to 110 kHz. That is, regarding the numerical values of the switching frequencies before and after switching according to the size of the output current, the numerical values described in this specification are merely examples, and the present invention is compatible with changing from an arbitrary numerical value to an arbitrary numerical value, according to the product form of the voltage conversion device where the invention is applied.

Note that in the first to fourth embodiments, a case is described of using voltage mode control of feeding back a detected output voltage, but the present invention is likewise applicable to a case of using current mode control of feeding back a detected output current in addition to an output voltage.

Also, a case is described in which the DC/DC converter 1 reduces the voltage of the battery 3 and supplies this reduced voltage to the load 4, but the DC/DC converter 1 also may increase the voltage of the battery 3, or may increase or decrease the voltage of the battery 3.

The embodiments disclosed in this application are to be considered in all respects as illustrative and not restrictive. The scope of the present invention is indicated by the scope of the claims rather than by the meaning of the above description, and all changes that come within the meaning and range of equivalency of the claims are intended to be embraced therein. Also, technical features described in the respective embodiments can be combined with each other.

The invention claimed is:

1. A voltage conversion device having a switching element, an inductor, and a drive circuit, the voltage conversion device generating, by turning the switching element on/off with the drive circuit with a PWM signal, an inductor current to transform an inputted voltage and output the transformed voltage to a load, the voltage conversion device comprising:
   a switch for switching a switching frequency with the drive circuit according to the size of output current to the load; and
   a digital controller for changing a waveform of the PWM signal when the switch switches the switching frequency;
   wherein the digital controller changes an on time of the PWM signal and the digital controller sets a change amount of the waveform of a first PWM signal to have a duty cycle smaller than the subsequent PWM signals such that a lower limit value of the inductor current immediately after switching the switching frequency matches the lower limit value in a steady state, and turns the switching element on/off.

2. The voltage conversion device according to claim 1, wherein the change amount of the waveform of the PWM signal that the digital controller changes includes at least one of the on time of the PWM signal and a duty ratio of the PWM signal.

3. The voltage conversion device according to claim 2, wherein the digital controller changes the waveform in only one cycle of the PWM signal immediately after switching the switching frequency.

4. The voltage conversion device according to claim 2, wherein the digital controller changes the waveform in a plurality of cycles of the PWM signal immediately after switching the switching frequency.

5. The voltage conversion device according to claim 2, wherein when switching the switching frequency with the switch, the on time of the PWM signal immediately after switching is shorter than the on time of the PWM signal immediately before switching.

6. The voltage conversion device according to claim 2, wherein when switching the switching frequency with the switch, the on time of the PWM signal immediately after switching is shorter than the on time of the PWM signal immediately before switching.

7. The voltage conversion device according to claim 1, wherein the digital controller changes the waveform in only one cycle of the PWM signal immediately after switching the switching frequency.

8. The voltage conversion device according to claim 7, wherein when switching the switching frequency with the switch, the on time of the PWM signal immediately after switching is shorter than the on time of the PWM signal immediately before switching.

9. The voltage conversion device according to claim 1, wherein the digital controller changes the waveform in a plurality of cycles of the PWM signal immediately after switching the switching frequency.

10. The voltage conversion device according to claim 9, wherein when switching the switching frequency with the switch, the on time of the PWM signal immediately after switching is shorter than the on time of the PWM signal immediately before switching.

11. The voltage conversion device according to claim 1, wherein when switching the switching frequency with the switch, the on time of the PWM signal immediately after switching is shorter than the on time of the PWM signal immediately before switching.

12. The voltage conversion device according to claim 1, wherein the digital controller changes the waveform in only one cycle of the PWM signal immediately after switching the switching frequency.

13. The voltage conversion device according to claim 1, wherein the digital controller changes the waveform in a plurality of cycles of the PWM signal immediately after switching the switching frequency.

14. The voltage conversion device according to claim 1, wherein when switching the switching frequency with the switch, the on time of the PWM signal immediately after switching is shorter than the on time of the PWM signal immediately before switching.

15. A voltage conversion method performed by a voltage conversion device having a switching element, an inductor, and a drive circuit, the voltage conversion device generating, by turning the switching element on/off with the drive circuit with a PWM signal, an inductor current to transform an inputted voltage and output the transformed voltage to a load, the voltage conversion method comprising:
   changing a waveform of the PWM signal when switching a switching frequency with the drive circuit according to the size of output current to the load;
   changing an on time of the PWM signal wherein a first PWM signal has a duty cycle smaller than subsequent PWM signals and a lower limit value of the inductor current immediately after switching the switching frequency matches the lower limit value in a steady state;
   turning the switching element on/off; and
   wherein a change amount of the waveform of the PWM signal that the digital controller changes includes at least one of the on time of the PWM signal and a duty ratio of the PWM signal.

\* \* \* \* \*